US011658903B2

(12) United States Patent
Betha et al.

(10) Patent No.: US 11,658,903 B2
(45) Date of Patent: May 23, 2023

(54) NETWORK DEVICE ROUTE PROGRAMMING

(71) Applicant: Arista Networks, Inc., Santa Clara, CA (US)

(72) Inventors: Sandeep Betha, Burnaby (CA); Santosh Kumar, Burnaby (CA)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

(21) Appl. No.: 17/353,865

(22) Filed: Jun. 22, 2021

(65) Prior Publication Data
US 2022/0321463 A1 Oct. 6, 2022

Related U.S. Application Data

(60) Provisional application No. 63/171,205, filed on Apr. 6, 2021.

(51) Int. Cl.
*H04L 45/42* (2022.01)
*H04L 45/121* (2022.01)
*H04L 45/00* (2022.01)
*H04L 45/02* (2022.01)

(52) U.S. Cl.
CPC ............. *H04L 45/42* (2013.01); *H04L 45/02* (2013.01); *H04L 45/121* (2013.01); *H04L 45/22* (2013.01)

(58) Field of Classification Search
CPC ....... H04L 45/42; H04L 45/02; H04L 45/121; H04L 45/22
See application file for complete search history.

(56) References Cited

U.S. PATENT DOCUMENTS

| | | | | |
|---|---|---|---|---|
| 6,636,895 B1* | 10/2003 | Li | ........................... | H04L 45/16 709/239 |
| 6,917,983 B1* | 7/2005 | Li | ........................... | H04L 45/02 370/392 |
| 7,418,003 B1* | 8/2008 | Alvarez | .................. | H04L 45/00 370/466 |
| 8,611,346 B1* | 12/2013 | Wijnands | .............. | H04L 12/185 370/312 |
| 8,638,789 B1* | 1/2014 | Pani | ...................... | H04L 12/185 370/390 |
| 9,019,981 B1* | 4/2015 | Weinstein | .............. | H04B 1/719 370/469 |
| 9,602,294 B1* | 3/2017 | Zhang | ................. | H04L 12/1868 |

(Continued)

OTHER PUBLICATIONS

Headquarters, Americas. "IP Routing: OSPF Configuration Guide, Cisco IOS Release 15.0 SY." (2011). http://audentia-gestion.fr/cisco/iro-15-sy-book.pdf.*

(Continued)

*Primary Examiner* — Jimmy H Tran
(74) *Attorney, Agent, or Firm* — Sprinkle IP Law Group

(57) ABSTRACT

A method for processing routes by a network device connected to a network includes: generating a programmable route based on a route programming request associated with a route between the network device and a request origin device; storing the programmable route in a temporary route storage in the network device; and upon receiving a data packet associated with the programmable route, permitting installation of the programmable route in a network device hardware of the network device.

20 Claims, 7 Drawing Sheets

(56) References Cited

U.S. PATENT DOCUMENTS

| | | | | |
|---|---|---|---|---|
| 9,832,290 B2* | 11/2017 | Manur | | H04L 69/28 |
| 9,838,210 B1* | 12/2017 | Peter | | H04L 12/18 |
| 10,958,564 B1* | 3/2021 | Asthana | | H04L 45/20 |
| 2003/0223372 A1* | 12/2003 | Sanchez | | H04L 45/00 |
| | | | | 370/235 |
| 2007/0165632 A1* | 7/2007 | Zwiebel | | H04L 45/00 |
| | | | | 370/390 |
| 2007/0183422 A1* | 8/2007 | Jung | | H04L 61/6068 |
| | | | | 370/390 |
| 2009/0028044 A1* | 1/2009 | Windisch | | H04L 12/1877 |
| | | | | 370/225 |
| 2009/0067426 A1* | 3/2009 | Ko | | H04L 47/10 |
| | | | | 370/392 |
| 2010/0115113 A1* | 5/2010 | Short | | H04L 67/01 |
| | | | | 709/228 |
| 2011/0222534 A1* | 9/2011 | Kurita | | H04L 45/60 |
| | | | | 370/389 |
| 2013/0114598 A1* | 5/2013 | Schrum | | H04L 45/22 |
| | | | | 370/392 |
| 2013/0121335 A1* | 5/2013 | Hui | | H04L 45/14 |
| | | | | 370/390 |
| 2014/0003245 A1* | 1/2014 | Han | | H04L 47/724 |
| | | | | 370/236 |
| 2014/0003246 A1* | 1/2014 | Han | | H04L 12/185 |
| | | | | 370/236 |
| 2014/0003281 A1* | 1/2014 | Han | | H04L 12/185 |
| | | | | 370/390 |
| 2014/0036915 A1* | 2/2014 | Dholakia | | H04L 45/586 |
| | | | | 370/390 |
| 2014/0254592 A1* | 9/2014 | Olofsson | | H04L 12/1863 |
| | | | | 370/390 |
| 2015/0055654 A1* | 2/2015 | Song | | H04L 45/74 |
| | | | | 370/392 |
| 2015/0138951 A1* | 5/2015 | Arumugam | | H04L 49/70 |
| | | | | 370/225 |
| 2016/0043935 A1* | 2/2016 | Mahadevan | | H04L 45/54 |
| | | | | 370/390 |
| 2016/0182358 A1* | 6/2016 | Peter | | H04L 61/1535 |
| | | | | 370/315 |
| 2016/0330102 A1* | 11/2016 | Fenner | | H04L 45/02 |
| 2017/0048153 A1* | 2/2017 | Feng | | H04L 47/2441 |
| 2017/0093732 A1* | 3/2017 | Akhavain Mohammadi | | |
| | | | | H04L 47/32 |
| 2017/0142021 A1* | 5/2017 | Chen | | H04L 47/6215 |
| 2018/0191870 A1* | 7/2018 | Ramesh | | H04L 69/03 |
| 2019/0068387 A1* | 2/2019 | Nandy | | H04L 12/18 |
| 2019/0312815 A1* | 10/2019 | Altman | | H04W 28/0231 |
| 2019/0334810 A1* | 10/2019 | Nandy | | H04L 45/42 |
| 2020/0036552 A1* | 1/2020 | Boutros | | H04L 45/64 |
| 2020/0036646 A1* | 1/2020 | Mathew | | H04L 41/0813 |
| 2020/0052998 A1* | 2/2020 | Barth | | H04L 45/50 |
| 2020/0177438 A1* | 6/2020 | Nandy | | H04L 41/0836 |
| 2021/0036952 A1* | 2/2021 | Pattabhiraman | | H04L 63/101 |
| 2021/0377154 A1* | 12/2021 | Dutta | | H04L 45/48 |
| 2022/0052967 A1* | 2/2022 | Natarajan | | H04L 47/2441 |
| 2022/0191148 A1* | 6/2022 | Raindel | | G06F 15/163 |
| 2022/0247672 A1* | 8/2022 | Wei | | H04L 45/02 |
| 2022/0255898 A1* | 8/2022 | Zaino | | H04L 45/74 |

OTHER PUBLICATIONS

Fenner, Bill, et al. "Protocol Independent Multicast-Sparse Mode (PIM-SM): Protocol Specification (Revised)." RFC 7761 (2016): 1-137. https://www.hjp.at/doc/rfc/rfc4601.html.*

* cited by examiner

NETWORK DEVICE ROUTE PROGRAMMING

CROSS-REFERENCE TO RELATED APPLICATIONS

This application claims priority from U.S. Provisional Application No. 63/171,205, filed Apr. 6, 2021, the entire contents of which are incorporated herein.

BACKGROUND

In a typical protocol independent multicast (PIM) sparse mode (PIM-SM) configuration, when a network device (e.g., a switch, router, multilayer switch, etc.) in the PIM-SM tree receives an (S, G) join request from a neighbor network device, an (S, G) route is automatically programmed (or installed) in the network device. Each installed (S, G) route takes up a portion of the network device's hardware resources (e.g., volatile memory, ternary content-addressable memory, etc.). A network device's hardware resources may be significantly exhausted (i.e., available remaining resources are reduced) when multiple unnecessary/inactive (S, G) routes are installed, leading to a direct reduction in the network device's functionality.

DETAILED DESCRIPTION

Figure 1A:
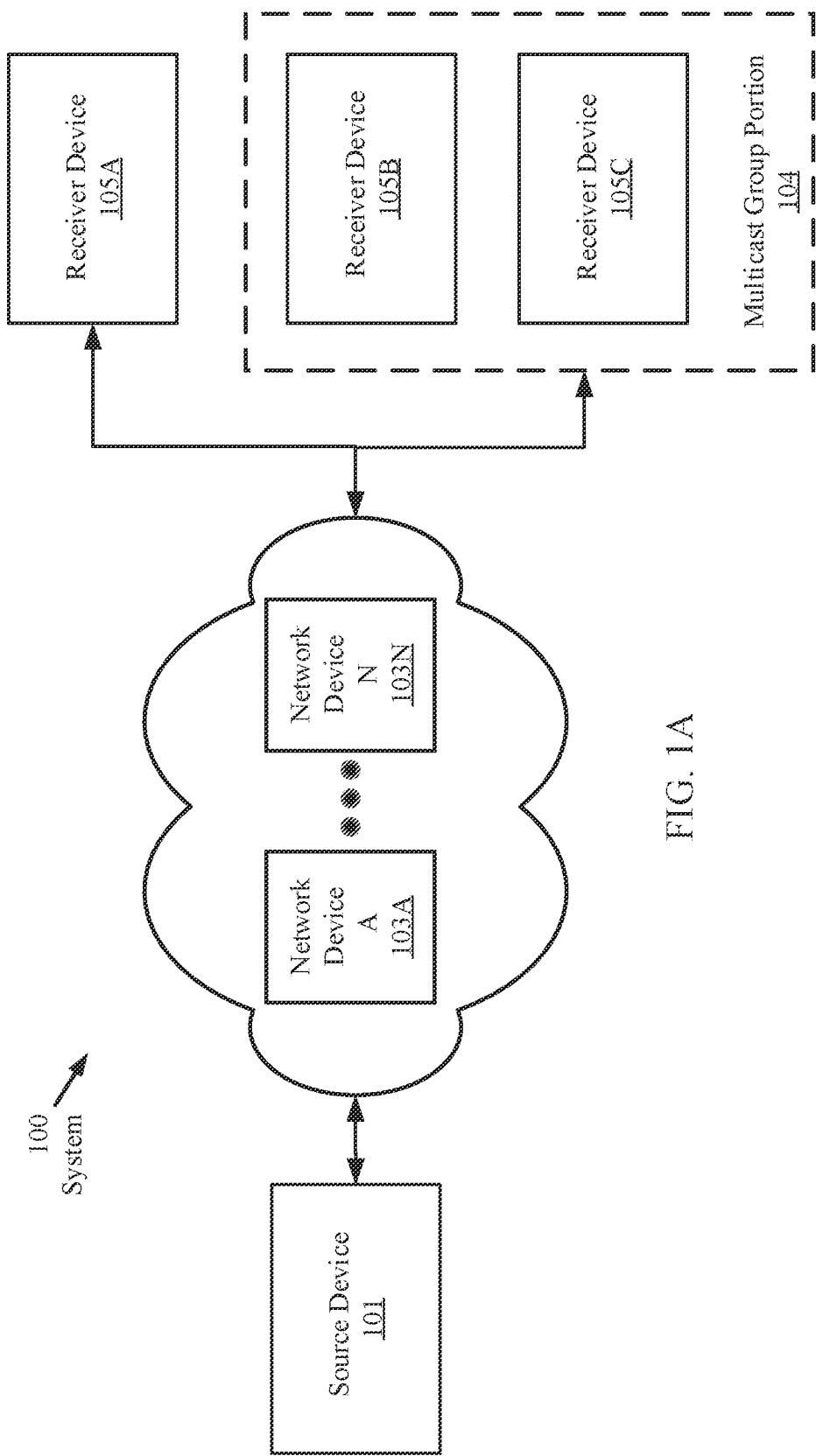
FIG. 1A shows a system in accordance with one or more embodiments described herein.

In general, in one aspect, the disclosure relates to a method for processing routes by a network device connected to a network, the method comprising: receiving, by the network device, a route programming request to program a route between the network device and a request origin device; parsing the route programming request to generate a programmable route and storing the programmable route in a temporary route storage of the network device, wherein the programmable route comprises a device identification (ID) of the request origin device; parsing information in a memory of the network device to identify a trapped data packet associated with the programmable route, wherein the trapped data packet associated with the programmable route includes the device ID of the request origin device; in response to determining that there is no trapped data packet associated with the programmable route, preventing installation of the programmable route in a network device hardware of the network device and maintaining the programmable route in the temporary route storage; and in response to determining that the trapped data packet is associated with the programmable route: initiating installation of the programmable route as a programmed route in the network device hardware on the network device; forwarding the trapped packet associated with the programmable route to the request origin device using the programmed route; and deleting the programmable route from the temporary route storage.

In general, in one aspect, the disclosure relates to a method for processing routes by a network device connected to a network, the method comprising: generating a programmable route based on a route programming request associated with a route between the network device and a request origin device; storing the programmable route in a temporary route storage in the network device; and upon receiving a data packet associated with the programmable route, permitting installation of the programmable route in a network device hardware of the network device.

In general, in one aspect, the disclosure relates to a network device configured to process routes on a network comprising: a memory; and a processor coupled to the memory. The processor: receives a route programming request associated with a route between the network device and a request origin device; generates a programmable route based on the route programming request; stores the programmable route in a temporary route storage in the memory of the network device; parses a header of a trapped data packet stored in the memory of the network device to determine whether the trapped data packet is associated with the programmable route; and in response to determining that the trapped data packet is associated with the programmable route, initiates installation of the programmable route as a programmed route in a network device hardware of the network device.

To provide better utilization of a network device's hardware resources and to prevent a network device from installing unnecessary (i.e., inactive) (S, G) routes, in one or more embodiments, a network operating system (NOS) (or an agent executing thereon) evaluates an (S, G) route before the route is installed. In particular, in one or more embodiments, an (S, G) route is not installed (i.e., the (S, G) route is deemed inactive) if there are no packets for the particular route being received by the network device.

For example, in one or more embodiments, a source network device may be connected to two receivers (e.g., network devices) (e.g., receiver 1 and receiver 2) through network device A. Both receivers 1 and 2 send (S, G) join requests to network device A. Receivers 1 and 2 use different multicast groups. Upon receipt of the (S, G) join requests, the network device A generates two programmable (S,G) routes. Alternatively, if receivers 1 and 2 use the same multicast group (e.g., group 1), only one programmable (S, G) route is generated for that group.

In one or more embodiments, these newly generated routes are not immediately programmed into network device A's hardware (i.e., network device A's network device hardware); rather, they are stored in a temporary route storage (e.g., volatile storage in the network device that is separate from the network device hardware that is used to process incoming packets) of network device A. Additionally, in one or more embodiments, network device A may be connected to multiple other network devices that are sending (S, G) join requests to network device A.

In one or more embodiments, each of the newly generated (S, G) routes remains in the temporary route storage until traffic associated with the particular (S, G) route is received. For example, when network device A receives an (S, G) join request from receiver 1, network device A generates a programmable (S, G) route and temporarily stores the programmable (S,G) route for a predetermined period (e.g., 210 seconds) in the temporary route storage. The programmable (S, G) route is kept in the temporary storage as long as network device A continues to receive (S, G) join requests from receiver 1. In one or more embodiments, the (S, G) join requests may be sent at a set interval (e.g., every 60 seconds), and the temporarily stored programmable (S, G) route will be deleted if receiver 1 stops sending the (S, G) join requests or if receiver 1 sends an (S, G) prune request. If traffic for a given (S, G) route is received, then network device A (or an agent executing thereon) initiates the programming of the particular (S, G) route into network device A's network device hardware.

In one or more embodiments, if network device A's network device hardware is full, the programmed (S, G) route will be held by network device A until a space frees up in network device A's network device hardware. Once the particular (S, G) route is programmed, the traffic for the particular (S, G) route is processed by network device A's network device hardware using the programmed (S, G) route.

The above functionality of programming an (S, G) route may be implemented at any time. For example, in one or more embodiments, the functionality may be implemented during an initialization of a network device prior to any (S, G) routes being installed. Alternatively, the functionality may be implemented on a network device with existing installed (S, G) routes. In such a case, all existing installed (S, G) routes are assessed for traffic activity, and all (S, G) routes determined to be inactive (e.g., no packets for a given (S, G) route have been received during a predetermined period(s) of time) are deprogrammed from the network device's network device hardware. Further, any newly received (S, G) join requests are processed in accordance with the aforementioned functionality. Such configurations directly improve the functionality of the network device) by preventing unnecessary exhaustion of the network's hardware resources.

In one or more embodiments, the PIM agent may also include functionality to determine whether a network device supports hitless restart (i.e., a restart of only the software processes of the network device while maintaining all programmed paths in the network device's hardware). If a network device supports hitless restart, the PIM agent may determine whether the network device just initiated a hitless restart. Any network devices that initiated a hitless restart will not be affected by the above (S, G) route programming function. In particular, the (S, G) routes that are recovered post hitless restart will not be dropped even though these routes have no traffic. This configuration advantageously prevents any unnecessary churn in the PIM-SM network from the removal and re-adding of (S, G) routes post hitless restart.

In one or more embodiments, the above-discussed (S, G) route programming functionality can also be extended to validating routes installed in unicast and bidirectional PIM (Bidir-PIM).

Various embodiments of the disclosure are described below.

FIG. 1A shows a system (100) in accordance with one or more embodiments of the disclosure. The system (100) includes a source device (101) connected to one or more receiver devices (105A-105C) through one or more network devices (103A, 103N). Receiver devices (105B, 105C) use a same multicast group portion (104) of a PIM-SM configuration while receiver device (105A) uses a different multicast group portion (not shown). Each of these components is described below.

In one embodiment of the disclosure, a source device (101) is any device that includes functionality to transmit data towards multiple receivers. For example, the source device (101) is a computing device (see, e.g., FIG. 4).

For example, in one embodiment of the disclosure, the source device (101) is a physical device or a virtual device (i.e., a virtual machine executing one or more physical devices) that may be used for performing various embodiments of the disclosure. The physical device may correspond to any physical system with functionality to implement one or more embodiments of the disclosure. For example, the physical device may be a server (i.e., a device with at least one or more processor(s), memory, and an operating system) that is directly (or operatively, e.g., via the network) connected to at least one network device (e.g., 103A, 103N) and at least one receiver device (e.g., 105A-105C).

Alternatively, the physical device may be a special purpose computing device that includes one or more application-specific processor(s) (or hardware) configured to only execute embodiments of the disclosure. In such cases, the physical device may implement embodiments of the disclosure in hardware as a family of circuits and may retain limited functionality to receive input and generate output in accordance with various embodiments of the disclosure. In addition, such computing devices may use a state-machine to implement various embodiments of the disclosure.

In another embodiment of the disclosure, the physical device may correspond to a computing device that includes one or more general purpose processor(s) and one or more application-specific processor(s) (or hardware). In such cases, one or more portions of the disclosure may be implemented using the operating system and general purpose processor(s), while one or more portions of the disclosure may be implemented using the application-specific processor(s) (or hardware).

In one embodiment of the disclosure, source device (101) includes executable instructions (stored in a non-transitory computer readable medium (not shown)), which when executed, enable the source device (101) to perform the functionality described through this application.

In one embodiment of the disclosure, the source device (101) may be a multicast source device that transmits data towards one or more multicast groups (e.g., multicast group portions including one or more of receiver devices (105A-105C)). A multicast source device may not necessarily be aware of the devices of a multicast group to which the multicast source device transmits data, but may instead be configured to transmit a single copy of the data to a single alias representing the multicast group (e.g., a multicast Internet Protocol (IP) address defined for the group). A multicast group may have zero or more members at any given time. As used herein, the term multicast refers to the transmission of data via a network from a single source to a group that may include multiple recipients. In one or more embodiments disclosed herein, the source device (101) may also be configured as a unicast source device that transmits data towards only one receiver.

Data transmitted by a source device (101) may originate from one or more applications (not shown) executing on the source device (101), and may be transmitted in the form of data packets. As an example, a source device (101) may be a device for transmitting video data to one or more receivers so that the video data may be viewed (e.g., via a display device) by a user of each receiver. In a multicast configuration, a single copy of multicast data (i.e., data transmitted by the source device (101) to one or more multicast groups) may be transmitted from the source device (101), with replication of the data for the multicast receivers occurring via the one or more network devices (103A, 103N) along the network path between the source device (101) and the various receivers of the multicast group.

In one embodiment of the disclosure, the one or more network device(s) (103A, 103N) are physical devices that include persistent storage, memory (e.g., random access memory), one or more processor(s) (including a switch chip), and two or more physical ports. In one embodiment of the disclosure, the switch chip is hardware that determines which egress port on a network device (103A, 103N) to forward media access control (MAC) frames. The switch chip may include egress and ingress ports that may connect to ports on the network device (103A, 103N). Each port may or may not be connected to another device (e.g., a server, a switch, a router, etc.). The network device (103A, 103N) may be configured to receive packets via the ports and determine whether to: (i) drop the packet; (ii) process the packet in accordance with one or more embodiments of the disclosure; and/or (iii) send the packet, based on the processing, out of another port on the network device (103A, 103N).

How the network device (103A, 103N) makes the determination about whether to drop the packet, and/or send the packet to another device on the network depends, in part, on whether the network device (103A, 103N) is a layer-2 (L2) switch or a layer-3 (L3) switch (also referred to as a multilayer switch), which may perform at least some functions of a router. If the network device (103A, 103N) is operating as a L2 switch, the network device (103A, 103N) uses the destination MAC address along with a forwarding table to determine out of which port to send the packet. If the network device (103A, 103N) is operating as a L3 switch, the network device (103A, 103N) uses the destination Internet Protocol (IP) address along with a routing table to determine out of which port to send the packet, and includes the ability to write the MAC address of the next device to receive the packet in place of its own MAC address (which the last device to send the packet wrote) in the L2 information encapsulating the packet. If the network device (103A, 103N) is a multilayer switch, the multilayer switch includes functionality to process packets using both MAC addresses and IP addresses.

In one embodiment of the disclosure, the persistent storage in the network device may include any type of non-transitory computer readable medium that stores data. For example, the data in the persistent storage may be instructions, which, when executed by one or more processor(s) in the network device (103A, 103N), enable the network device (103A, 103N) to perform all or a portion of the functions described in accordance with one or more embodiments of the disclosure (see e.g., FIGS. 2A-3B).

Examples of the network devices (103A, 103N) include, but are not limited to, a router, a switch, and a multilayer switch. The network devices (103A, 103N) are not limited to the aforementioned specific examples. Additional details about the network devices (103A, 103N) are described below with respect to FIG. 1B.

In one embodiment of the disclosure, the network devices (103A, 103N) may be part of the network. As used herein, a network may be the medium through which the source device (101), the network devices (103A, 103N), and the receiver devices (105A-105C) are operatively connected. In one embodiment of the disclosure, the network may include other network devices (or systems) (not shown) that facilitate communication between the aforementioned components. As such, in one embodiment of the disclosure, the network may include any combination of local and/or wide area (e.g., Internet) network segments that may be wire-based and/or wireless and that may use any combination of wired and/or wireless communication protocols.

In one embodiment of the disclosure, the one or more receiver devices (105A-105C) are any devices that include functionality to receive data from a source device (101). For example, each receiver device (105A-105C) may be a computing device (see e.g. FIG. 4) or virtual instance (discussed above). Alternatively, a receiver device may be a network device (discussed above).

In a multicast setting, a receiver device (105A-105C) may be a multicast receiver device that includes functionality to be a member of a multicast group portion (104), and, as such, to receive data from a multicast source device (e.g., the source device (101)). The multicast receiver device may include functionality to join and leave a multicast group portion (104) via join messages and leave messages, respectively. As an example, join and/or leave messages may be Internet Group Management Protocol (IGMP) messages.

One scheme for propagating multicast network traffic in a network is defined, at least in part, by RFC 4601, the PIM-SM Protocol Specification. PIM-SM is a multicast protocol that can use routing information obtained via various other unicast and/or multicast routing protocols in order to build unidirectional shared trees that are rooted at a Rendezvous Point (RP) (e.g., network device (103A)), and which branch out towards one or more multicast receiver devices. In one or more embodiments of the disclosure, PIM-SM is enabled on a network device, thereby enabling the network device to participate in the propagation of multicast traffic using the PIM-SM protocol. PIM-SM may be enabled for individual interfaces of a network device. A network device with at least one PIM interface may be referred to as a PIM enabled network device.

Figure 1B:
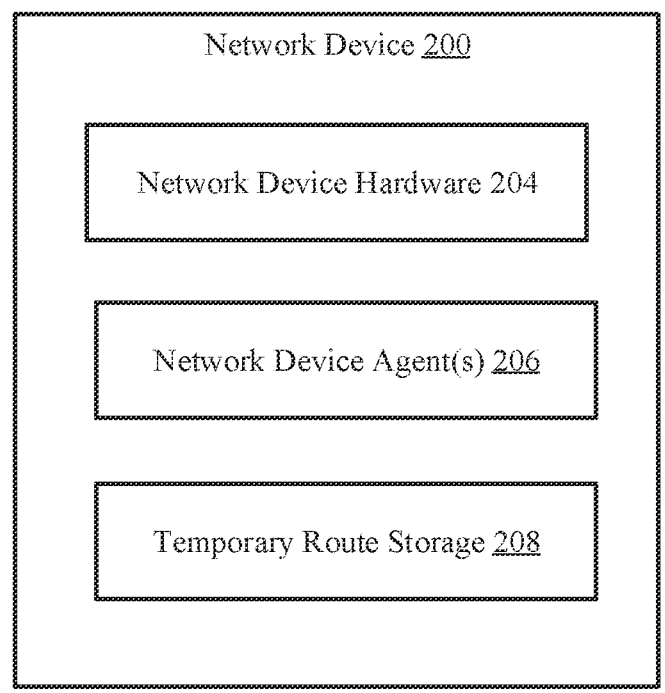
FIG. 1B shows a diagram of a network device in accordance with one or more embodiments disclosed herein.

FIG. 1B shows a network device (200) in accordance with one or more embodiments of the disclosure. The network device (200) may be any one of the one or more network devices (103A, 103N) discussed above. In addition to the components discussed above in reference to FIG. 1A, the network device (200) further includes a network device hardware (204), one or more network device agents (206), and a temporary route storage (208). The network device (200) may include additional, fewer, and/or different components without departing from the disclosure. Each of the components illustrated in FIG. 1B is described below.

In one embodiment of the disclosure, network device hardware (204) includes all of the physical components of the network device (200) as discussed above in reference to FIG. 1A, and is associated with the data plane (i.e., the forwarding plane or the carrier plane) of the network device (200). Said another way, the network device hardware (204) is for implementing the data plane of the network device (200).

In one embodiment of the disclosure, the network device agent(s) (206) interacts with the other components of the network device (200). Each network device agent (206) facilitates the implementation of one or more protocols, services, and/or features of the network device (200). Examples of network device agents (206), include, but are not limited to, a bug-alerts agent, a policy agent that manages access control lists, a user interface agent, a routing information base agent, a forwarding information base agent, and a simple network management protocol (SNMP) agent.

Furthermore, each network device agent (206) includes functionality to access various portions of the network device (200) in order to control a route programming functionality of the network device agent (206). In one embodiment of the disclosure, the network device agent (206) manages the generation, programming, deprogramming, and up-keeping of routes (e.g., high-speed data paths in the data plane) between the network device (200) and other devices in communication with the network device (200). These routes are programmed (i.e., installed) onto the network device hardware (204). This will be discussed in more detail in FIGS. 2A-3B below.

In one embodiment of the disclosure, the network device agent (206) is configured to generate a programmable route for each route to be programmed onto the network device hardware (204). The programmable route includes information associated with the network device (200) and the device (e.g., another network device (200) or one of the receiver devices (105A-105C)) that will be connected to the network device (200) via the fully programmed route. For example, the programmable route may include at least a device identification (device ID) and an IP address of both devices. In the context of this disclosure, the term "programmable route" is used to refer only to a route that may be programmed onto the network device hardware (204); once a programmable route is programmed onto the network device hardware (204), it is no longer referred to as a "programmable route" herein.

In one embodiment of the disclosure, the network device agent (206) further includes functionality to process the data packets received by the network device (200) from a source device (101). Said another way, the network device agent (206) manages traffic of the data packets (i.e., traffic activity) passing through the network device (200). In particular, the network device agent (206) may process (e.g., trap, block, drop, forward, duplicate, etc.) data packets based on the routes programmed in the network device hardware (204). Furthermore, the network device agent (206) is configured to use information associated with the traffic of the data packets to manage (e.g., program or deprogram) the routes in the network device hardware (204). This will be discussed in more detail in FIGS. 2A-3B below.

In one or more embodiments of the disclosure, prior to a route being programmed in the network device hardware (204), the network device agent (206) is configured to send all data packets to the control plane of the network device (200). Additionally, the network device hardware (204) does not use the programmable routes to process any data packets. Once a route is programmed in the network device hardware (204) by the network device agent (206), the network device agent (206) is configured to process all packets, which are associated with the route and received subsequent to the route being programmed, using the newly programmed route.

In one embodiment of the disclosure, the temporary route storage (208) may be implemented in-memory (i.e., the contents of the temporary route storage (208) may be maintained in volatile memory). Alternatively, the temporary route storage (208) may be implemented using persistent storage. Said another way, the temporary route storage (208) is a portion of memory in the network device (200) specifically configured to store the programmable routes generated by the network device agent (206). In one embodiment of the disclosure, the temporary route storage (208) is only implemented in the control plane of the network device (200). Said another way, the network device hardware (204) does not include the temporary route storage (208).

One skilled in the art will recognize that the architecture of the system (100), of a network device (200), and of the network is not limited to the components shown in FIGS. 1A and 1B. For example, the network may include any number and any type of network devices participating in the sharing of states. Further, the network device (200) may include components not shown in FIG. 1B.

Figure 2A:
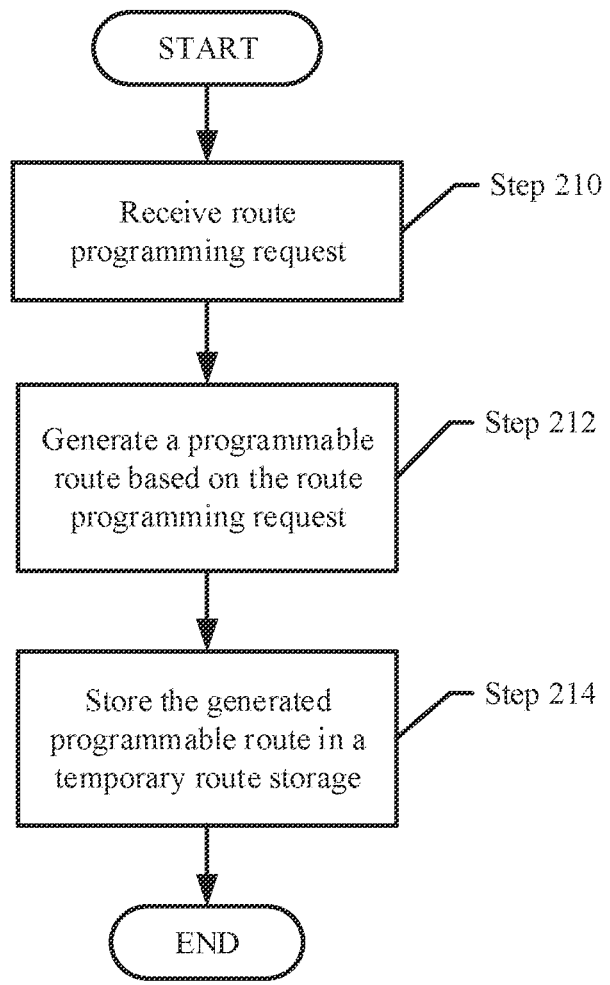
FIG. 2A shows a flowchart describing a method for processing a route programming request by a network device in accordance with one or more embodiments described herein.

FIG. 2A shows a flowchart describing a method for processing a route programming request by a network device in accordance with one or more embodiments described herein. The method of FIG. 2A may be performed by, for example, the network device (e.g., 200, FIG. 1B). Other components illustrated in FIGS. 1A and 1B may perform the method of FIG. 2A without departing from the disclosure. Further, one or more steps in FIG. 2A may be performed concurrently with one or more steps in FIGS. 2A and 2B.

While the various steps in the flowchart shown in FIG. 2A are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 210, a route programming request is received from an external application (i.e., a request origin device) by a network device. The route programming request may specify that a route should be programmed between the network device and another device (e.g., a receiver device or another network device) on the network. The route programming request may also include information (e.g., a device ID, a device IP, etc.) associated with a source device (e.g., 101, FIG. 1A) that the request origin device wishes to be connected to via the network device (200). In one embodiment of the disclosure, the route programming request may be an (S, G) join request sent from a device supporting PIM-SM.

In Step 212, as discussed above in reference to FIG. 1B, a programmable route is generated based on the route programming request.

In Step 214, the programmable route is stored into a temporary route storage of the network device. In one embodiment of the disclosure, the programmable route is not programmed onto the network device hardware of a network device prior to being stored into the temporary route storage. Furthermore, a programmable route generated for a specific request origin device is removed (i.e., deleted or processed) from the temporary route storage when: (i) a predetermined time (e.g., 2 minutes to 210 seconds) has elapsed since the last route programming request was received from the request origin device; (ii) the network device receives a disconnect request (e.g., an (S, G) prune request in a PIM-SM environment) from the request origin device; or (iii) the programmable route is processed by a network device agent of the network device resulting in the programmable route being programmed onto the network device hardware.

Figure 2B:
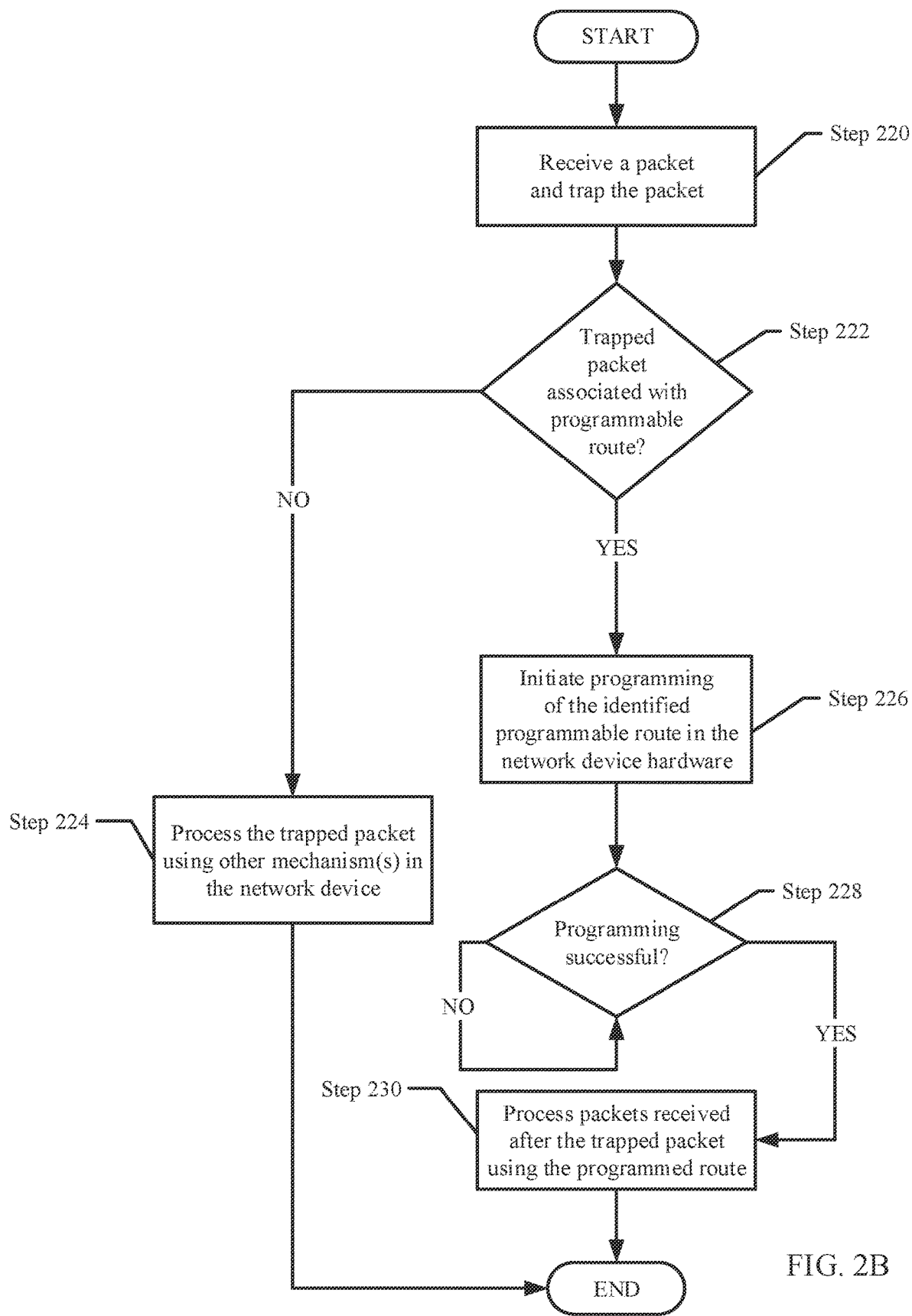
FIG. 2B shows a flowchart describing a method for programming a route by the network device in accordance with one or more embodiments described herein.

FIG. 2B shows a flowchart describing a method for programming a route by the network device in accordance with one or more embodiments described herein. The method of FIG. 2B may be performed by, for example, a network device (e.g., 200, FIG. 1B). Other components illustrated in FIGS. 1A and 1B may perform the method of FIG. 2B without departing from the disclosure. Further, one or more steps in FIG. 2B may be performed concurrently with one or more steps in FIGS. 2A and 2B.

In Step 220, a data packet is received from an external application and trapped by the network device agent. In one embodiment of the disclosure, this trapped data packet (i.e., trapped packet) may be temporarily stored in a persistent storage of the network device. Said another way, in the context of this disclosure, the term "trapped packet" refers to a data packet that is first temporarily held by the network device in persistent storage and then processed to be forwarded to another device on the network rather than being directly processed and forwarded upon receipt.

In Step 222, a determination is made about whether the trapped packet is associated with a programmable route (e.g., a route that is currently stored in the temporary route storage). In one or more embodiments disclosed herein, this determines whether traffic activity associated with the programmable route exists on the network device.

In one or more embodiments, the network device may parse the information (e.g., metadata including a device ID, a device IP, etc.) included in a header of the trapped packet to identify a transmission source and destination of the trapped packet. This information is then used to determine whether there is a programmable route in the temporary route storage that can be used to process the trapped packet (i.e., to forward the trapped packet towards its destination). If the trapped packet is associated with a programmable route, the method proceeds to Step 226; otherwise, the method proceeds to Step 224.

In Step 224, the trapped packet is processed using mechanisms in the network device other than the route programming process of one or more embodiments disclosed herein. For example, in one embodiment of the disclosure, the trapped packet is forwarded to an intended destination using the control plane of the network device. In another embodiment of the disclosure, the trapped packet is dropped. In yet another embodiment of the disclosure, the trapped packet is associated with an existing programmed route on the network device hardware and forwarded using the existing programmed route.

In Step 226, programming of the identified programmable route (i.e., the programmable route identified in step 222) onto the network device hardware of the network device is initiated. In one embodiment of the disclosure, if the network device hardware is full (i.e., does not have sufficient space to program the programmable route), the programmable route will be held by the network device (e.g., in a persistent storage of the network device or the temporary route storage) until sufficient space frees up in the network device hardware. Additionally, a programmable route that is being programmed onto the network device hardware may be permanently removed from the temporary route storage once the programming is started.

In Step 228, a determination is made as to whether the programming of the programmable route in Step 226 is successful. If the programming is determined to be successful, the method proceeds to Step 230; otherwise, the method remains at Step 228 until it is determined that the programming is successful. In one or more embodiments, while the method remains at Step 228, the trapped packet is maintained in the persistent storage until the route is successfully programmed. Other data packets associated with the route being programmed in Steps 226 and 228 are temporarily stored in the persistent storage until the route is successfully programmed. Additionally, other data packets not associated with the route being programmed in Steps 226 and 228 received after the trapped packet are separately processed starting with above-discussed Step 220.

In Step 230, all the packets associated with the route, whether temporarily stored in the persistent storage or received after the route has been successfully programmed, are processed using the programmed route between the network device and the request origin device. In one embodiment of the disclosure, the trapped packet along with all data packets received prior to the successful programming of the route in Step 230 may be processed using the control plane of the network device.

In one or more embodiments, once a route is programmed, the network device agent determines whether subsequent route programming requests (e.g., (S,G) join requests) are received for the programmed route. If no subsequent route programming requests associated with the programmed route are received within a predetermined period of time (e.g., 210 seconds), the programmed route is deprogrammed (i.e., removed) from the network device hardware and a new route will have to be programmed in accordance with the method discussed above in FIGS. 2A and 2B.

In yet another embodiment, if the network device supports hitless restart and a hitless restart was initiated, any programmed routes on the network device hardware recovered after the hitless restart are not evaluated for traffic activity. In particular, a programmed route may continue to exist for a predetermined period of time (e.g., 210 seconds) until the network device stops receiving (S, G) joins associated with the programmed route.

Although 210 seconds is provided as an example for the predetermined period of time in the above descriptions, one of ordinary skill in the art will appreciate that the predetermined period of time may be set to any amount of time depending on the specific settings and configurations of the network and/or the network device.

EXAMPLE

Figure 3A:
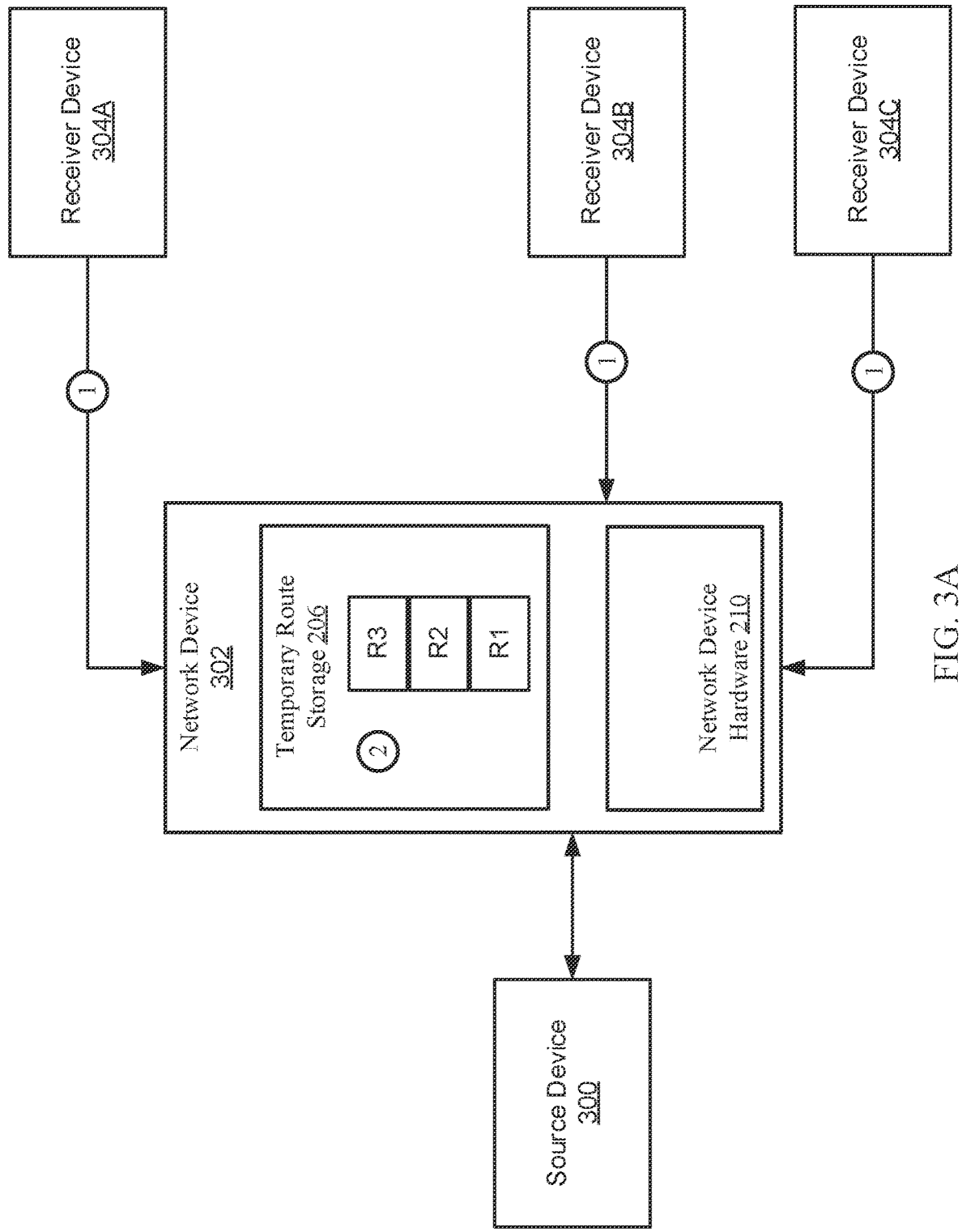
FIGS. 3A and 3B show an example in accordance with one or more embodiments described herein.
Figure 3B:
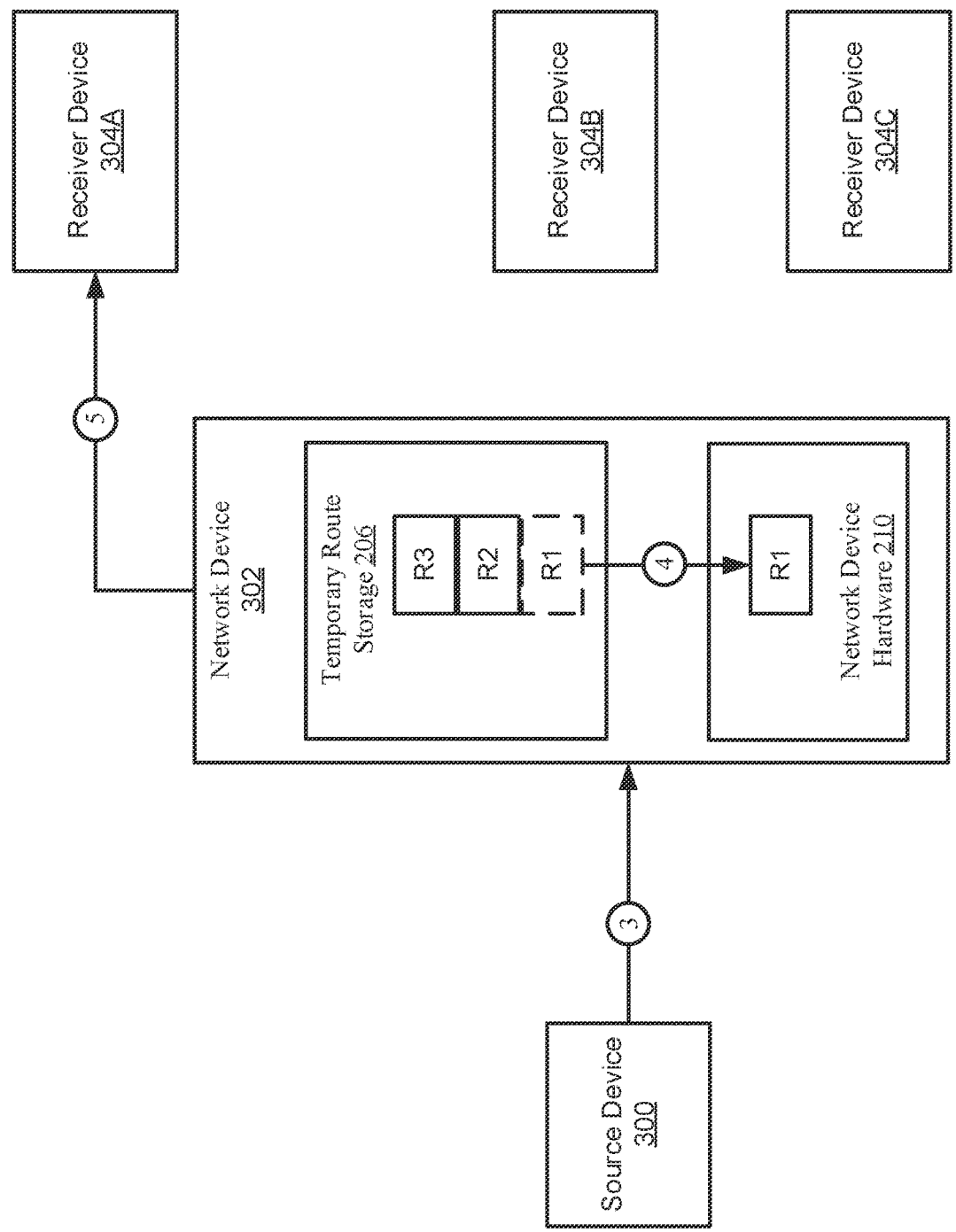

FIGS. 3A and 3B show an example in accordance with one or more embodiments of the disclosure. The example is not intended to limit the disclosure. Turning to the example, consider a scenario in which a network device determines whether a route should be programmed between the network device and one or more receiver devices in communication with the network device. The network device (302) receives a route programming request from each of receiver devices (304A-304C) [1]. For each received route programming request, the network device (302) generates a programmable route (R1-R3) and stores the programmable routes in the temporary route storage (206) [2].

Concurrently or at a later point in time, the network device (302) receives a data packet from a source device (300) [3]. The network device (302) traps the data packet and associates, after processing the header of the trapped packet, the trapped packet with programmable route (R1) in the temporary route storage (206) [3]. The network device subsequently initiates programming of only the programmable route (R1) on the network device hardware (210) [4]. Once the temporary route (R1) is successfully programmed in the hardware, a route is programmed between the network device (302) and the receiver device (304A) associated with the programmable route (R1) [5].

End of Example

Figure 4:
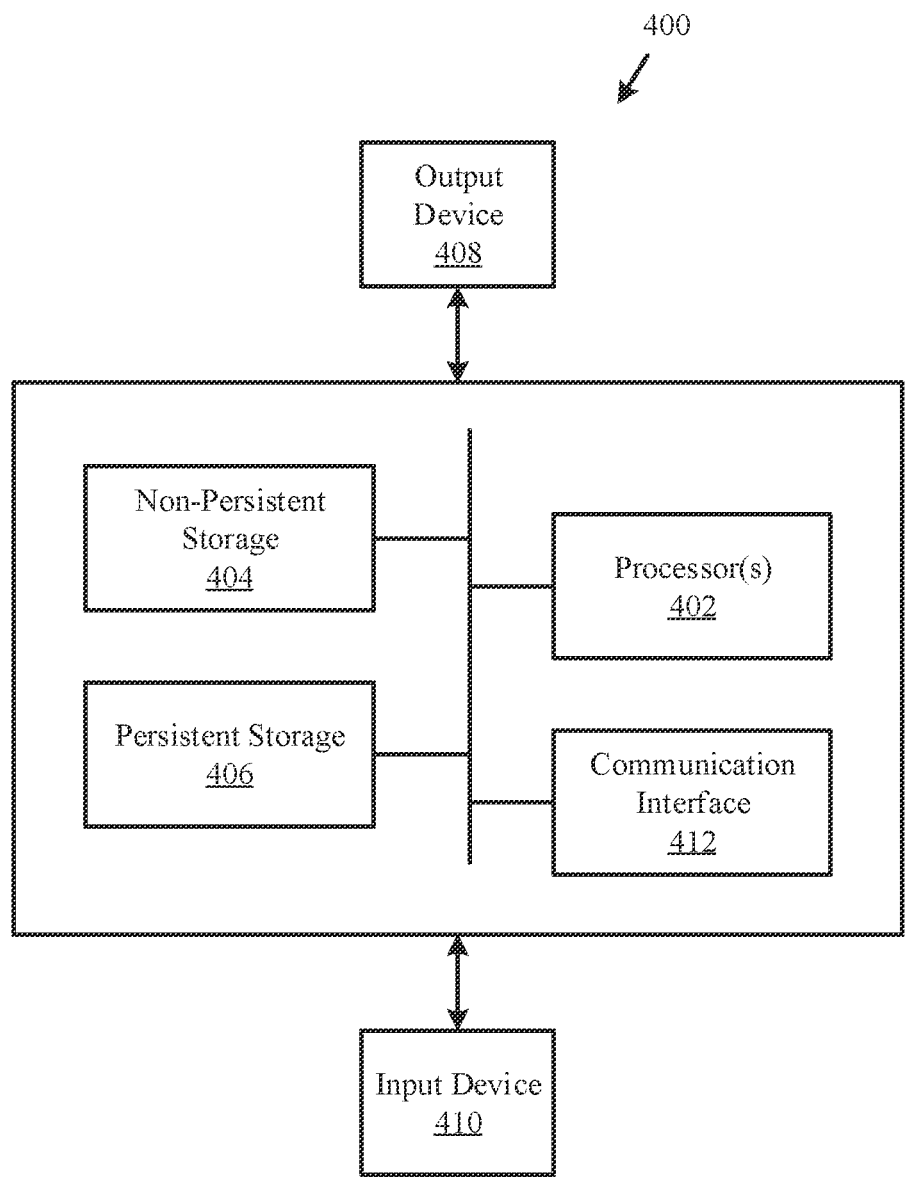
FIG. 4 shows a diagram of a computing device in accordance with one or more embodiments described herein.

As discussed above, embodiments of the disclosure may be implemented using computing devices. FIG. 4 shows a diagram of a computing device in accordance with one or more embodiments of the disclosure. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of the components illustrated in FIG. 4 is described below.

In one embodiment of the disclosure, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the disclosure, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

Embodiments described herein allow for an improved allocation of a network device's hardware resources by determining whether a route should be programmed on (or deprogrammed from) the network device's hardware. This also directly improves the network device's functionality by reducing the number of unnecessary (i.e., inactive) routes programmed on the network device's hardware.

Specific embodiments have been described with reference to the accompanying figures. In the above description, numerous details are set forth as examples. It will be understood by those skilled in the art, and having the benefit of this Detailed Description, that one or more embodiments described herein may be practiced without these specific details and that numerous variations or modifications may be possible without departing from the scope of the embodiments. Certain details known to those of ordinary skill in the art may be omitted to avoid obscuring the description.

In the above description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for processing routes by a network device connected to a network, the method comprising:
   receiving, by the network device, a route programming request to program a route between the network device and a request origin device;
   parsing the route programming request to generate a programmable route and storing the programmable route in a temporary route storage of the network device, wherein the programmable route comprises a device identification (ID) of the request origin device;
   parsing information in a memory of the network device to identify a trapped data packet associated with the programmable route, wherein the trapped data packet associated with the programmable route includes the device ID of the request origin device;
   in response to determining that there is no trapped data packet associated with the programmable route, preventing installation of the programmable route in a network device hardware of the network device and maintaining the programmable route in the temporary route storage; and
   in response to determining that the trapped data packet is associated with the programmable route:
   initiating installation of the programmable route as a programmed route in the network device hardware on the network device;
   forwarding the trapped packet associated with the programmable route to the request origin device using the programmed route; and deleting the programmable route from the temporary route storage.

2. The method of claim 1, wherein the route programming request is an (S,G) join request.

3. The method of claim 1, wherein the method further comprises:
determining whether a subsequent route programming request associated with the request origin device is received within a predetermined period of time since the programmable route is generated; and
in response to determining that the subsequent route programming request Is received within the predetermined period of time, maintaining the programmable route in the temporary route storage; and
in response to determining that the predetermined period of time has elapsed before the subsequent route programming request is received, deleting the programmable route from the temporary route storage.

4. A method for processing routes by a network device connected to a network, the method comprising:
generating a programmable route based on a route programming request associated with a route between the network device and a request origin device;
storing the programmable route in a temporary route storage in the network device; and
upon receiving a data packet,
determining a source and a destination of the data packet,
based on the source and the destination of the data packet, determining that the data packet is able to be processed by the programmable route, and
permitting installation of the programmable route in a network device hardware of the network device.

5. The method of claim 4, wherein the method further comprises:
while no data packets associated with the programmable route are received by the network device, preventing installation of the programmable route in the network device hardware and maintaining the programmable route in the temporary route storage.

6. The method of claim 5, wherein the network device hardware does not process packets using the programmable route while installation of the programmable route in the network device hardware is prevented.

7. The method of claim 4, wherein subsequent data packets, associated with the programmed route received after the data packet, are processed by the network device hardware using the programmed route.

8. The method of claim 4, wherein the method further comprises:
monitoring the programmed route for additional route programming requests subsequent to the route programming request; and
in response to not receiving additional route programming requests within a predetermined period of time, deprogramming the programmed route from the network device hardware of the network device.

9. The method of claim 4, further comprising removing the programmable route from the temporary route storage.

10. The method of claim 4, wherein permitting installation of the programmable route in the network device hardware of the network device upon receiving the data packet associated with the programmable route comprises:
trapping the data packet by the network device and storing the data packet in a memory of the network device;
determining that a header of the trapped data packet comprises information specifying a source device; and
determining that the programmable route stored in the temporary route storage comprises the information specifying the source device.

11. The method of claim 4, wherein the route programming request is an (S,G) join request.

12. The method of claim 4, wherein the temporary route storage is associated with a control plane of the network device.

13. The method of claim 5, further comprising:
determining that:
a predetermined period of time has elapsed since the programmable route was generated,
no subsequent route programming requests have been received from the request origin device before the predetermined period of time has elapsed, and
no data packets associated with the programmable route have been received by the network device before the predetermined period of time has elapsed; and
deleting, based on the determining, the programmable route from the temporary storage.

14. A network device configured to process routes on a network comprising:
a memory; and
a processor coupled to the memory,
wherein the processor:
receives a route programming request associated with a route between the network device and a request origin device;
generates a programmable route based on the route programming request;
stores the programmable route in a temporary route storage in the memory of the network device;
parses a header of a trapped data packet stored in the memory of the network device to determine a source and a destination of the data packet;
determines, based on the source and the destination of the data packet, whether the programmable route is able to process the trapped data packet; and
in response to determining that the trapped data packet can be processed by the programmable route, initiates installation of the programmable route as a programmed route in a network device hardware of the network device.

15. The network device of claim 14, wherein the processor further:
in response to determining that the trapped data packet is not associated with the programmable route, prevents installation of the programmable route as the programmed route in the network device hardware and maintains the programmable route in the memory.

16. The network device of claim 14, wherein subsequent data packets associated with the programmed route received after the installation of the programmable route are processed by the network device hardware using the programmed route.

17. The network device of claim 14, wherein the network device hardware does not process data packets using the programmable route.

18. The network device of claim 14, wherein the parsing of the header of the trapped data packet to determine whether the trapped data packet is associated with the programmable route further comprises:
trapping a data packet received by the network device and storing the trapped data packet in the memory;
determining that a header of the trapped data packet comprises information specifying a source device; and determining that the programmable route stored in the temporary route storage also comprises the information specifying the source device.

19. The network device of claim 14, wherein the route programming request is an (S,G) join request.

20. The network device of claim 15, wherein the processor further:
  determines that:
    a predetermined period of time has elapsed since the programmable route was generated,
    no subsequent route programming requests have been received from the request origin device before the predetermined period of time has elapsed, and
    no trapped packets in the memory are associated with programmable route before the predetermined period of time has elapsed; and
  deletes, based on the determining, the programmable route from the temporary storage.

* * * * *